(12) United States Patent
Jones et al.

(10) Patent No.: US 7,972,587 B2
(45) Date of Patent: Jul. 5, 2011

(54) HYDROGEN PRODUCTION FROM BIOMASS

(75) Inventors: Christopher W. Jones, Mableton, GA (US); Pradeep K. Agrawal, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 829 days.

(21) Appl. No.: 11/849,526

(22) Filed: Sep. 4, 2007

(65) Prior Publication Data

US 2008/0103344 A1    May 1, 2008

Related U.S. Application Data (60) Provisional application No. 60/841,821, filed on Sep. 1, 2006.

(51) Int. Cl.
   *C01B 3/26* (2006.01)

(52) U.S. Cl. .............. 423/651; 423/644; 423/648.1; 423/650; 423/652; 423/653; 423/654

(58) Field of Classification Search .......... 423/644, 423/648.1, 650–654
   See application file for complete search history.

(56) References Cited

U.S. PATENT DOCUMENTS

| | | | | |
|---|---|---|---|---|
| 4,400,468 A * | 8/1983 | Faber | ............................ | 435/142 |
| 4,536,584 A | 8/1985 | Eskamani et al. | ............ | 549/429 |
| 6,699,457 B2 | 3/2004 | Cortright et al. | | |
| 6,824,576 B2 * | 11/2004 | Lightner | ..................... | 48/127.9 |
| 6,949,757 B2 | 9/2005 | Hasegawa et al. | | |
| 6,953,873 B2 | 10/2005 | Cortright et al. | | |
| 6,964,758 B2 | 11/2005 | Cortright et al. | .......... | 423/648.1 |
| 2002/0083644 A1 * | 7/2002 | Sata et al. | ........................ | 48/61 |
| 2005/0207971 A1 * | 9/2005 | Cortright et al. | ............. | 423/657 |

OTHER PUBLICATIONS

Valenzuela et al. ("Batch Aqueous-Phase Reforming of Woody Biomass". Energy & Fuels, 20, p. 1744-1752, 2006.*
http://pubs.acs.org/doi/full/10.1021/ef060113p (Demonstrating that the article "Valenzuela et al. ("Batch Aqueous-Phase Reforming of Woody Biomass". Energy & Fuels, 20, p. 1744-1752, 2006" was available to the public in Jun. 2006.*
Bruce, et al.; Reactions of cis-[PtCl2(PEt3)2] with Silver Salts in Aqueous Solution, in the Presence or Absence of PEt3; J. Chem. Soc., Dalton Trans. 1984; pp. 2249-2253.
Cole-Hamilton; Photocatalysis of the Homogeneous Water-gas Shift Reaction; J.C.S. Chem. Comm., 1980; pp. 1213-1215.
Odell, et al.; Hydrothermal Reactions of Lactic Acid Catalysed by Group VIII Metal Complexes; Journal of Organoteallic Chem, 290 (1985) pp. 241-248.
Morton, et al.; Molecular Hydrogen Complexes in Catalysis: Highly Efficient Hydrogen Production . . . ; J. Chem. Soc., Chem. Commun., 1988; pp. 1154-1156.
Morton, et al.; Rapid Thermal Hydrogen Production from Alcohols catalysed by [Rh(2,2'-bipyridyl)2]Cl; J. Chem. Soc., Chem. Commun., 1987; pp. 248-249.
Morton, et al.; Hydrogen Production from Ethanol catalysed by Group 8 Metal Complexes; J. Chem. Soc., Dalton Trans. 1989; pp. 489-494.
Delgado-Lieta, et al.; The Photochemical decomposition of alcohols catalyzed by try (isophropyl) phosphine complexes . . . ; Polyhedron; vol. 1, No. 11-12; pp. 839-840; 1982.

(Continued)

*Primary Examiner* — Jessica L Ward
*Assistant Examiner* — Paul A Wartalowicz
(74) *Attorney, Agent, or Firm* — Thomas, Kayden, Horstemeyer & Risley, LLP (57) ABSTRACT

Briefly described, methods of generating ($H_2$) from a biomass and the like, are disclosed.

25 Claims, 6 Drawing Sheets

OTHER PUBLICATIONS

Jones, et al.; Photochemical Production of Hydrogen from Water and Nucleophilic Platinum Metal Complexes; J.C.S. Chem. Comm., 1981; pp. 58-59.

MacDougall, et al.; Alcohols as Scources of Hydrogen in Hydroformylation of Alkenes; Polyhedron, vol. 9, No. 9, pp. 1235-1236, 1990.

* cited by examiner

FIG. 1 cellulose

FIG. 2a galactoglucomannan

FIG. 2b arabinoglucuronoxylan

FIG. 2c proposed structural segment of lignin

FIG. 7
(Scheme 1)

HYDROGEN PRODUCTION FROM BIOMASS

CROSS-REFERENCE TO RELATED APPLICATION

This application claims priority to U.S. provisional application entitled, "Hydrogen Production From Woody Biomass," having Ser. No. 60/841,821, filed on Sep. 1, 2006, which is entirely incorporated herein by reference.

BACKGROUND

Over the years, concerns about the steady decline of the available supply of petroleum in the face of ever-increasing demand for this valuable commodity have fueled researchers to look for possible alternative energy sources as well as chemical feedstock. One such resource is biomass. Biomass is a renewable, $CO_2$-neutral and readily available source of energy. According to Oak Ridge National Laboratory estimates, about 512 million dry tons of biomass per year can be initially available at less than $50/dry ton delivered. This amount is equivalent to 8.09 Quads of primary energy. Currently, only 72 million dry tons (1.2 Quads) are being used for fuel. This leaves quite a margin that can still be exploited for energy production. Putting this into perspective, 6.89 Quads is about 1.2 B barrels of oil—equivalent to about 27% of the US net import of crude oil in 2004.

Hydrogen has been identified as a potential energy source, in addition to its role as an important intermediate in the chemical and petrochemical industry. Presently, most technologies rely on fossil fuels as the source of hydrogen production. Considering concerns about the future supply of petroleum, extensive research on alternative hydrogen generation technologies is currently underway. Several processes have been explored to produce hydrogen from biomass. One of the existing approaches involves the pyrolysis of biomass, followed by subsequent reforming of the bio-oil produced. Another technology is biomass gasification. However, these processes require very high temperatures (673 K-1100 K) even in the presence of catalysts and different gasification agents. A hydrogen yield of about 26 and 32 mmol/g sawdust has been reported in the gasification of aspen and cedar wood, respectively, at 2.4 wt % impregnation with CaO. They reported that the presence of CaO caused a decrease in the temperature from ~850° C. to ~675° C. at which the hydrogen production rate was at a maximum.

Hydrothermal processing of biomass and related model compounds has also been reported in the literature as a possible technology for hydrogen production. Modell in 1985 reported the complete solubility of maple sawdust in supercritical water. Sinag et al. also studied hydropyrolysis of glucose in supercritical water. In the presence of $K_2CO_3$ at supercritical water conditions, they reported high yields of $CO_2$ and $H_2$ with low yields of CO. Degradation compounds identified in the liquid by-product included furfural, phenols, and acids. The group of Antal et al. also studied the hydrothermal processing of wood, suggesting mechanisms for the formation of degradation products from wood carbohydrate constituents.

Figure 2A:
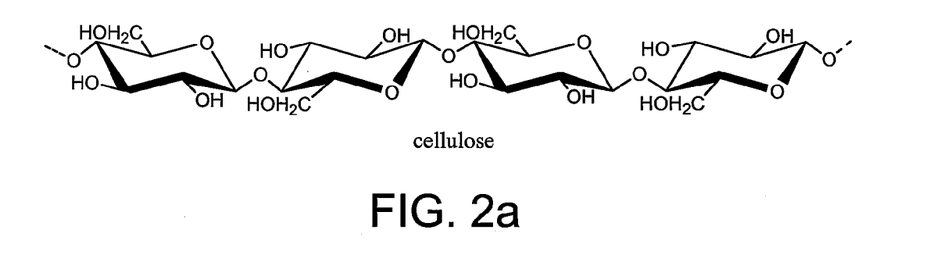
(FIG. 2a) cellulose.
Figure 2B:
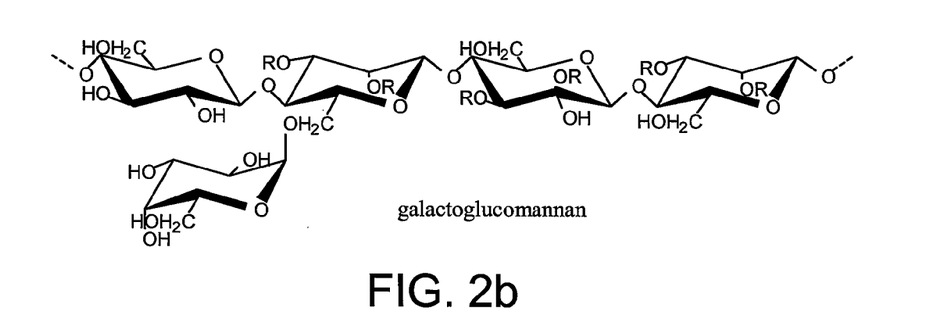
(FIG. 2b) galactoglucomannan.
Figure 2C:
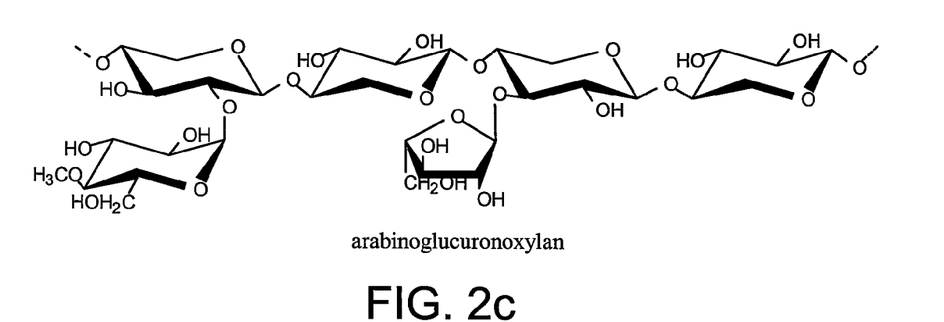
(FIG. 2c) arabinoxylan; and, (FIG. 2d) lignin.
Figure 2D:
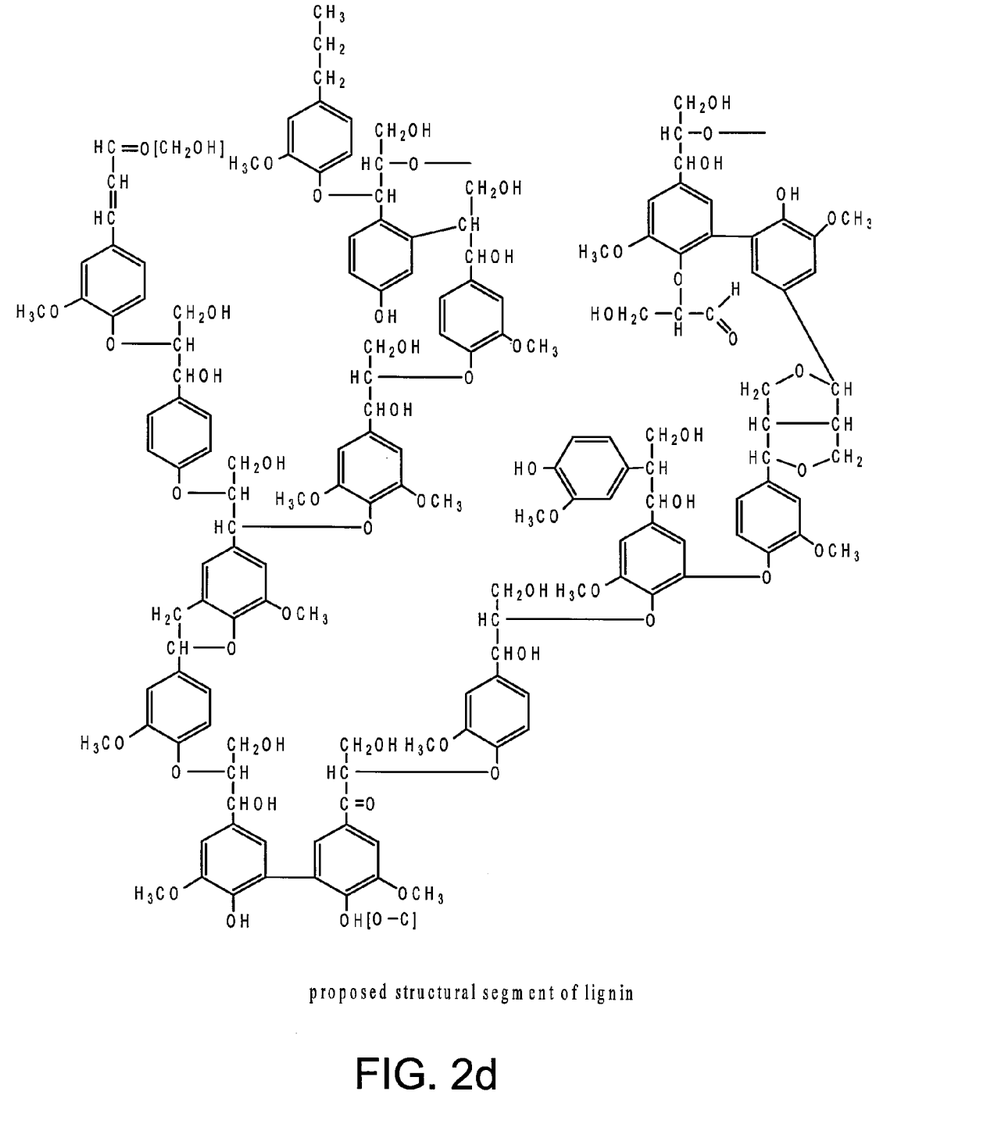

In 2002, Dumesic et al. first reported aqueous-phase reforming (APR) of oxygenated compounds that were chosen as model biomass mimics. They demonstrated the capacity to produce hydrogen in a flow reactor at temperatures (~500K) much lower than those required for either pyrolysis or gasification. They reported that APR of molecules more reduced than sugars (methanol and ethylene glycol) had the highest hydrogen selectivity. Dumesic's group considered two reactions to be of major importance for hydrogen evolution: the reforming reaction (C—C cleavage), and the water-gas shift (WGS) reaction, Lignocellulosic biomass is chemically complex, consisting of cellulose, hemicellulose, lignin, extractives and inorganic materials. The first three groups are the main constituents, comprising as high as 98% of the material by weight. Both cellulose and hemicellulose are polymeric carbohydrates. The former (FIG. 2a) is a linear homopolymer of β-D-glucose linked by β-1→4 glycosidic linkages with high degrees of polymerization (DP). Cotton fibers contain the purest naturally occurring cellulose—with DP reaching as high as 10,000. The linearity of cellulose allows it to be compactly packed in crystalline regions in the cell wall. However, a small portion of the chains may become disordered and have a more random arrangement. These amorphous regions increase the susceptibility of cellulose to solvents and reagents.

The other carbohydrate group, collectively known as hemicelluloses, includes heteropolysaccharides of glucose, galactose, mannose, xylose and arabinose. Hemicelluloses are branched, with chains that are much shorter than cellulose (DP=150-250). Because of this, they are more susceptible to chemical degradation. Aside from the sugar components, some hemicellulose fractions may also be in acetylated or in uronic acid forms. FIG. 2 shows the two most abundant groups of hemicelluloses in plants. Mannans (FIG. 2b) are the major component of softwoods while xylans (FIG. 2c) are the main constituent of hardwoods. Lignin (FIG. 2d), on the other hand, is phenolic and structurally more complex than the other component. To date, all studies of APR have focused on the use of model compounds that could be derived from biomass, such as sorbitol and ethylene glycol—no one has yet reported the APR of actual biomass for hydrogen production.

Though biomass-derived energy is yet to be fully demonstrated as an economically viable alternative to fossil fuel, the application of this process directly to readily available biomass reserves may prove to be more attractive in the long run when petroleum becomes increasingly more scarce and expensive. So far, results of hydrogen production studies using APR on compounds such as ethylene glycol have been encouraging. However, due to its varied composition, we expect that APR of lignocellulosics would be more complicated than when using these representative compounds. The chemistries would certainly be different, with functionalities present in biomass that are absent in the model compounds. Reforming of biomass also introduces a solid phase into a previously completely aqueous phase feed. We also anticipated that unlike the previous studies, breakdown of polymeric structures to simpler molecules would be necessary for catalytic reforming to occur.

SUMMARY

Briefly described, embodiments of this disclosure include methods of generating hydrogen ($H_2$) from a biomass and the like, are disclosed. One exemplary method of generating hydrogen ($H_2$) from a biomass, among others, includes: providing a biomass, an acid, a catalyst, and water; mixing the biomass, the acid, the catalyst, and the water in a reaction chamber to form a mixture, wherein the reaction chamber is configured to form a gas tight seal; replacing a headspace gas in the reaction chamber with an inert gas; forming a gas tight seal in the reaction chamber; heating the mixture to at least about 200° C., wherein the pressure in the reaction chamber increases to at least about 200 pounds per square inch (psi), wherein acid hydrolysis breaks down the biomass into components; and generating $H_2$ from the biomass, wherein a catalytic reaction between the components of the biomass and the catalyst produce $H_2$.

One exemplary method of generating hydrogen ($H_2$) from a biomass, among others, includes: heating a biomass, an acid, a catalyst, and water in a reaction chamber to at least 200° C.; breaking down a biomass into one or more components using acid hydrolysis, wherein at least one of the component is selected from: cellulose and hemicellulose; and reacting the catalyst with the hydrolyzed components of the biomass to generate $H_2$.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

FIG. 2 illustrates representative structures of the main polymeric components in lignocellulosic biomass.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, liquid phase chemistry, gas phase chemistry, biology, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

In this specification and in the claims that follow, reference will be made to a number of terms that shall be defined to have the following meanings unless a contrary intention is apparent.

"Biomass" can be created as products, by-products, and/or residues of the forestry and agriculture industries. Biomass includes, but is not limited to, plants, trees, crops, crop residues, grasses, forest and mill residues, wood and wood wastes (e.g., saw dust), paper mill waste, waste paper, and combinations thereof. Biomass includes solids that are not soluble in water. In particular, biomass can include, but is not limited to, cellulose, lignin, hemicellulose, fatty acids, and/or triglycerides, however, the components of the biomass and the amount of each component in the biomass will vary based on the source of the biomass. The trees include, but are not limited to, pine trees and pine tree by-products and other tree or plant material (biomass) containing cellulose, lignin, and hemicellulose. In particular, the biomass is saw dust from pine trees.

The term "hydrolysis" is a chemical reaction or process in which a chemical compound (e.g., biomass) is acted upon by acid or base in the presence of water.

General Discussion

Methods of generating hydrogen ($H_2$) from a biomass are described herein. In general, the method includes mixing a biomass with an acid, a catalyst, and water in a reaction chamber. The mixture is heated to at least about 200° C., and typically up to about 230° C. or more and held at that temperature. In an embodiment, the mixture is sealed in the reaction chamber having a gas tight seal (e.g., a pressure of at least about 200 pounds per square inch (psi) up to about 500 psi or more) for a period of time (e.g., a hour or more). The biomass is initially broken down into components (e.g., cellulose, lignin, and/or hemicellulose) by acid hydrolysis. Then, the catalyst initiates a reaction of the components to generate $H_2$ and other gases.

Methods of the present disclosure are advantageous in that they pertain to the generation of $H_2$ from a biomass rather than model compounds. The process described involves a single reaction chamber, eliminating the need for separation of hydrolyzed components for subsequent catalytic reforming. The chemistry of the biomass is considerably different and more complex than that of model compounds (e.g., a solution of pure compounds with no solid components). In particular, the biomass would include chemical functionalities that are not present in the model compounds. This is in part due to the hundreds of compounds present in the biomass and the numerous reactions that can take place among them. In addition, the biomass includes a solid phase of the cellulose, lignin, hemicellulose, and other components, which must be broken down in such a manner that is cost effective and energy efficient, and results in compounds that can be used to produce $H_2$ via reaction in the presence of a catalyst.

Figure 1:
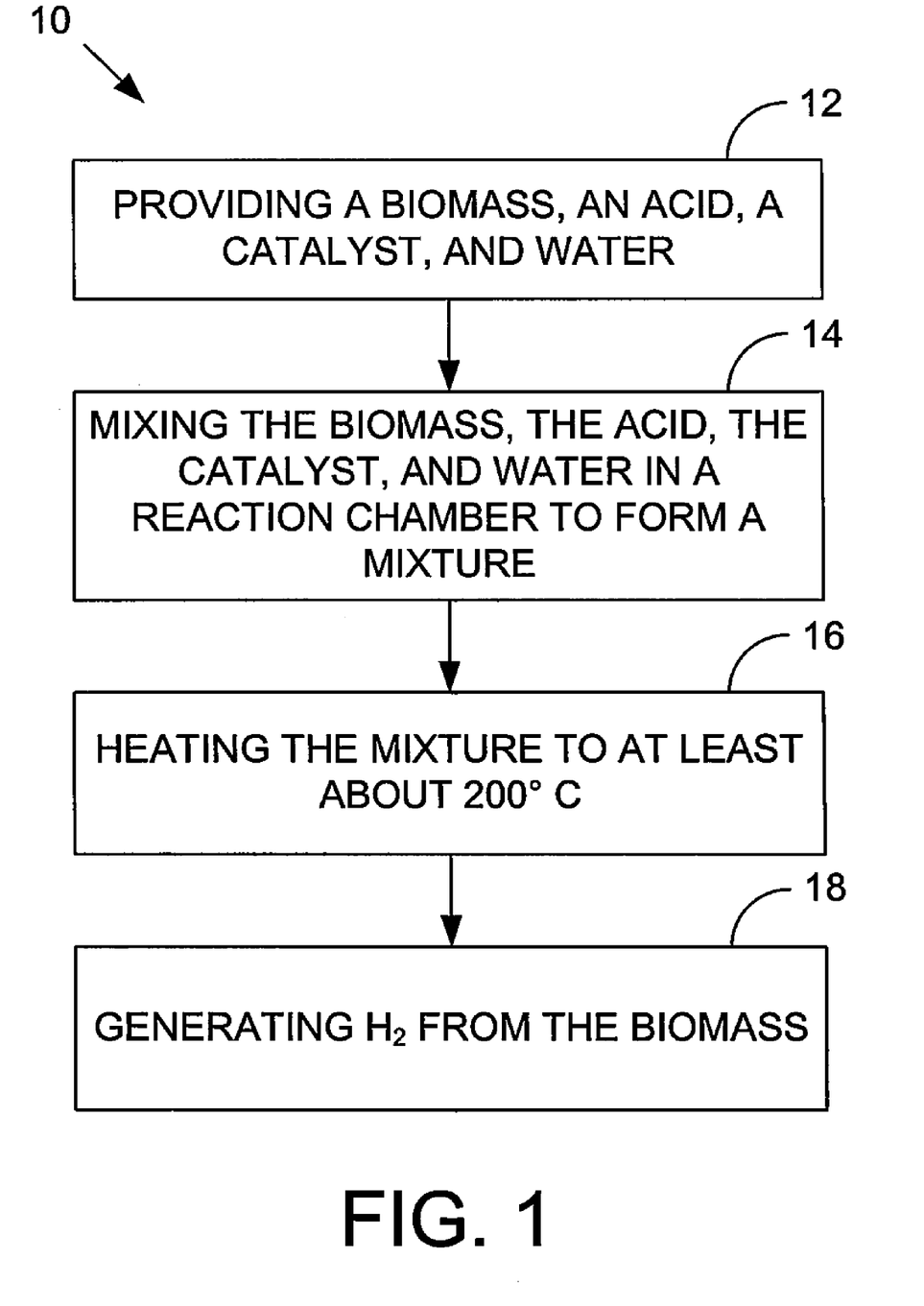
FIG. 1 illustrates a general method for generating $H_2$ from a biomass.

FIG. 1 illustrates a general method 10 for generating $H_2$ from a biomass. In Block 12, a biomass, an acid, a catalyst, and water are provided. Specific details regarding the components are described below. In Block 14, the biomass, the acid, the catalyst, and the water are kept stirred to form a mixture of the components. Specific details regarding the type of components and amounts of the components of the mixture are described below. In Block 16, the mixture is heated to at least about 200° C. Additional details about the rate of temperature increase and the pressure in the reaction chamber are described in more detail above. In Block 18, $H_2$ is generated from the biomass after heating the mixture to at least about 200° C., preferably at least about 230° C. for a period of time (e.g., one or more hours). The time, temperature, pressure, and other variables are described in more detail below.

As mentioned above, embodiments of the present disclosure include methods of generating $H_2$ from a biomass. In an embodiment, the biomass can be saw dust from a tree or shrub, and in another embodiment the biomass is saw dust from a pine tree. A biomass, an acid, a catalyst, and water can be disposed into a reaction chamber. Each of the components can be added at the same time or sequentially in any order to the reaction chamber. The reaction chamber can have a gas tight seal, so that the pressure rises as gas is formed from the biomass. In addition, the gas in the headspace above the mixture can be replaced with an inert gas (e.g., argon, nitrogen, helium, or a mixture thereof) prior to heating the components of the mixture, if such a purge is needed.

Once the components are added to the reaction chamber, the headspace gas can be purged and replaced with an inert gas. In an embodiment, the inert gas can be added to the reaction chamber to raise the pressure to about 15 to 45 psi. A gas tight seal can be made in the reaction chamber so that all of the gases produced from the biomass are contained therein, which increases the pressure in the reaction chamber (e.g., at least about 200 psi to 500 psi or more).

The mixture of the biomass, the acid, the catalyst, and the water can be heated to greater than about 200° C., or greater than about 230° C. The heating can be raised at about 5 to 10° C./minute. As the temperature increases, the pressure in the reaction chamber increases due to the production of gas (e.g., $H_2$) from the biomass.

Once the temperature of the mixture reaches about 230° C., the temperature is held constant or about constant. At this point of the method, the components of the mixture are reacting to produce gases (e.g., $H_2$). The temperature can be held at about 230° C. for about 1 to 3 hours, or until the reaction of the biomass is complete.

In another embodiment, the temperature at which the mixture is held at can be from about 200 to 300° C. For example, at lower temperatures, the amount of $H_2$ produced may be less than at 230° C. and/or be generated at a slower rate. In the alternative, at higher temperatures, the amount of $H_2$ produced may be more than at 230° C. and/or be generated at a slower rate, due to competing reactions.

The acid functions to at least break down and degrade the solid matter of the biomass into components such as, but not limited to, cellulose, lignin, hemicellulose, and the like, depending on the composition of the biomass. In particular, the biomass undergoes acid hydrolysis to produce monomers of cellulose and hemi-cellulose. These are 5- and 6-carbon member sugars, e.g., glucose, arabinose, galactose, mannose, etc. Prolonged exposure of these sugars to acid lead to the formation of other chemicals including hydrogen.

The acid can include, but is not limited to, sulfuric acid, nitric acid, hydrochloric acid, phosphoric acid, trifluoroacetic acid, and combinations thereof. In an embodiment, the acid is sulfuric acid. The concentration of the acid is about 3 to 8 wt % based on dry biomass. In particular, the concentration of the sulfuric acid is about 5 wt % based on dry biomass. It should also be noted that the ratio of biomass to water is about 4 to 15 parts of water per part of biomass.

The catalyst functions to catalyze the breaking of C—C bonds to produce $H_2$ relatively faster than breaking C—O bonds in components of the biomass after acid hydrolysis. The catalyst can include, but is not limited to, platinum (Pt), platinum compounds, nickel, nickel compounds, palladium, palladium compounds, ruthenium, ruthenium compounds, rhodium, rhodium compounds, iridium, iridium compounds, cobalt, cobalt compounds, mixtures of each, alloys of each, and combinations thereof. The catalyst can be loaded on a support (e.g., silica, alumina, or carbon), can be in the form of a pellet (particles), in the form of a powder, or a combination thereof. In an embodiment, the catalyst is $Pt/Al_2O_3$ (platinum supported on alumina). The ratio of dry biomass to catalyst is about 5 to 20 parts of biomass for one part of catalyst. In particular, the ratio of dry biomass to $Pt/Al_2O_3$ is about 10:1.

The reaction chamber functions to contain the reaction of the components of the mixture and can function at temperatures and pressures as noted in the methods described above. The reaction chamber will include one or more devices to heat the mixture, monitor the temperature of the mixture and gases in the headspace, monitor the pressure in the headspace, and stir the liquid mixture. As mentioned above, the reaction chamber can include one or more gas inlet/outlets to pump in and pump out inert gas and the gases produced by the degradation of the biomass. The reaction chamber can be made from materials able to withstand the high temperatures and pressures, for example, the reaction chamber can be made of Hastelloy C, stainless steel, and the like.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

EXAMPLES

Now having described the embodiments of the present disclosure, in general, example 1 describes some additional embodiments of the present disclosure. While embodiments of present disclosure are described in connection with example 1 and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Introduction

Aqueous-phase reforming (APR) is reported for the first time for the production of $H_2$ from actual biomass. The experiments are carried out in batch using a 100 mL Parr microreactor heated to 225° C. In this one-pot, two-step process, acid hydrolysis is used to break down the polymeric constituents of biomass to smaller water-soluble molecules and these species are reformed using a $Pt/Al_2O_3$ catalyst. The experiments show that increasing the acid concentration from 1% to 5% causes more than a twelve-fold increase in $H_2$ concentration, with hydrogen a minor product accounting for 18% of the non-condensable gas phase and $CO_2$ as the major product. In the presence of the $Pt/Al_2O_3$ reforming catalyst, both the selectivity and yield of hydrogen in the gas phase increase. This is accompanied by a noticeable decrease in carbon monoxide production, which is attributed to the activation of the water-gas shift reaction catalyzed by platinum. Comparison with other feeds such as glucose, wastepaper, and ethylene glycol showed that the amount of hydrogen produced from biomass is of a comparable magnitude per gram of feed, although biomass yields more hydrogen per gram of carbohydrate than either glucose or wastepaper. Baseline experiments with only the catalysts in the absence of any biomass show no increase in the reactor system pressure when only water and helium are present, indicating that the observed hydrogen produced is sourced from the biomass.

Experimental and Analytical Methods:

Materials

The lignocellulosic material used in this study was Southern pine saw dust—obtained from Georgia Pacific as small chips, milled and then passed through Tyler screens. The −35+60 fraction (average aperture: 375 μm) was used in the experiments. Elemental and proximate analyses were done by outside laboratories: Desert Analytic Laboratory for the elemental analysis of the wood and the IPST Wood Chemistry Laboratory for its proximate analysis. For comparison, office wastepaper, D-glucose (anhydrous, Fisher) and ethylene glycol (Fisher) were also investigated. Catalysts used were 2M sulfuric acid (diluted from concentrated stock, 36M, Fisher), platinum on alumina ($Pt/Al_2O_3$) pellets (0.5 wt. % Pt, Engelhard) and gamma-alumina ($\gamma$-$Al_2O_3$) powder (Strem Chemicals).

Apparatus

A 100-mL stainless steel Parr batch microreactor was used for all the runs in this study. It was outfitted with a gas collector at the outlet. The pressure of the collected product gas was allowed to equilibrate to atmospheric pressure in a balloon and samples were taken using gas tight syringes.

Procedure

In a typical experiment using sawdust, 5.54 g of biomass (10.63% moisture content via TGA) and 0.498 g $Pt/Al_2O_3$ pellets were put inside the reactor. The reactor configuration used did not allow for pre-reduction of the platinum catalyst before the reaction without exposure to ambient conditions. In order to obtain a liquid-to-wood ratio (L/W) of nine, 43.7 mL of water was added. Using a micropipette, 1.263 mL of 2M $H_2SO_4$ was transferred into the reactor for a 5% acid concentration run (wt % based on dry biomass). The pH of the resulting mixture was then recorded. After securing the reactor head, helium gas was allowed to flow through the reactor and to purge out air from the headspace. After about 1.5 minutes, the reactor was pressurized with 30 psig of He, sealed and then heated to 225° C. (498 K). The temperature and pressure of the system were recorded every 5 minutes. For runs where wastepaper was used, an additional 30 minutes of soaking in water was performed before the addition of acid and platinum. This was done for the easy defiberization of the paper.

Several baseline experiments were carried out to probe the possibility that the catalysts (both $H_2SO_4$ and $Pt/Al_2O_3$ in concert or separately) could catalyze the production of hydrogen from water. In these runs, only water and the catalyst(s) in question were put inside the reactor. Before the system was heated to the target temperature (about 225° C.), the reactor was pressurized with helium as mentioned above.

Analysis

The reaction was allowed to run for about 3 hours. Sampling of the gas phase was done at the end of this period. Two packed-column gas chromatography units were utilized for the gas analysis. The amount of hydrogen was analyzed using a Hewlett-Packard 6890 GC equipped with TCD and $N_2$ as carrier gas. Carbon dioxide was also quantifiable in the HP GC. Carbon monoxide, methane and carbon dioxide were analyzed in a Buck Scientific 910 GC packed with Carboxen 1000. This GC also has TCD, with He as carrier gas. The GCs were calibrated using a standard mixture of gases (Airgas). Aside from the permanent gases $H_2$, CO, and $CO_2$, methane and ethane were included in anticipation of the possible presence of the alkanes as reported in the literature.

The liquid and solid by-products of the reaction were centrifuged for separation. The solid residue was then oven-dried to remove water, weighed and was stored. Some of the solid residues were analyzed for carbohydrate content, extractives, lignin and ash at the IPST Wood Chemistry Laboratory. The liquid phase was also kept and stored for further analysis.

Characterization of the $Pt/Al_2O_3$ catalyst was done through hydrogen chemisorption experiments as well as elemental analysis. A Micromeritics ASAP 2020 instrument was used for hydrogen chemisorption experiments of fresh, spent as well as calcined spent $Pt/Al_2O_3$ at about 308 K. Before the isotherms were recorded, samples were evacuated at about 623 K followed by reduction in flowing $H_2$ at the same temperature. Elemental analyses of two samples (fresh and spent $Pt/Al_2O_3$) were completed by Galbraith Laboratories, Inc.

Results

Biomass

The elemental and proximate analysis of the wood sawdust used in the study is reported in Table 1. As expected, carbon was the most abundant element by weight considering that it is the backbone of almost all constituents in the wood. Together with oxygen and hydrogen, these three elements comprise more than 99% of the sample—comparable to the model oxygenated compounds that the group of Dumesic used in their APR studies.

The proximate analysis shows the abundance of the different group constituents in the wood—cellulose, hemicellulose, lignin, extractives and ash. Cellulose and hemicellulose contents are reported in terms of their monosaccharide constituents. Together, they comprise about 60% of the dry feed weight. Lignin is about 28%, having an acid-insoluble component and an almost negligible acid-soluble part. Extractives are nonstructural wood constituents that are necessary to maintain the diversified biological functions of the tree. Their composition and amount varies even in the different parts of the same tree. Together with the inorganic component of the wood dust, they account for 4% of the biomass weight.

Acid Hydrolysis

Figure 3:
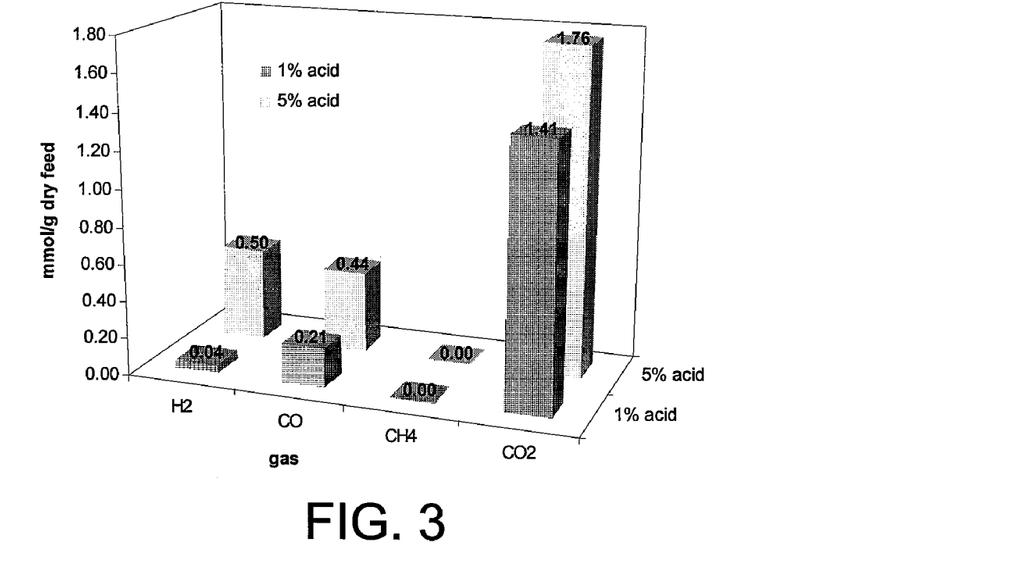
FIG. 3 illustrates gas production caused by acid hydrolysis of biomass in the absence of reforming catalyst.

FIG. 3 shows the amounts of gases produced after three-hour acid hydrolysis of biomass using 1% $H_2SO_4$ and 5% $H_2SO_4$ by dry weight of feed. As shown in the figure, an increase in the acid concentration caused an overall increase in the production of gases. There was more than an eleven-fold increase in the amount of $H_2$ produced with 5% acid than with 1% $H_2SO_4$. As expected, no methane was formed since there was no catalyst present in the system.

TABLE 1

Chemical composition of Southern pine sawdust used in the study.

| | Percentage of component based on dry weight of biomass (%) |
|---|---|
| Elemental Analysis | |
| C | 52.87 |
| H | 4.96 |
| O | 41.81 |
| N | 0.15 |
| S | <0.06 |
| Ash | 0.15 |
| Proximate Analysis[a] | |

TABLE 1-continued

Chemical composition of Southern pine sawdust used in the study.

| | Percentage of component based on dry weight of biomass (%) |
|---|---|
| Carbohydrates | |
| Arabinan | 1.00 |
| Galactan | 2.30 |
| Glucan | 39.00 |
| Xylan | 5.30 |
| Mannan | 11.70 |
| Lignin | |
| Acid insoluble | 27.50 |
| Acid soluble | 0.40 |
| Extractives | 3.70 |
| Ash | 0.30 |

[a]Proximate analysis from IPST Wood Chemistry laboratory did not sum to 100%. This may be attributed to possible insufficient hydrolysis before carbohydrate determination (percentages of other wood constituents agree with given value ranges in the literature). The HPLC-Pulsed amperometric determination (HPLC-PAD) method used was calibrated only to determine the listed monosaccharides. The presence of dimers or oligomers will not be accounted for because the program used was completed shortly after the last target sugar (i.e., mannose) eluted. This discrepancy was not encountered with the analyses of the solid residues (Table 2) - most probably because the majority of the carbohydrates were degraded during the reaction.

Aqueous-phase Reforming with Platinum

Figure 4:
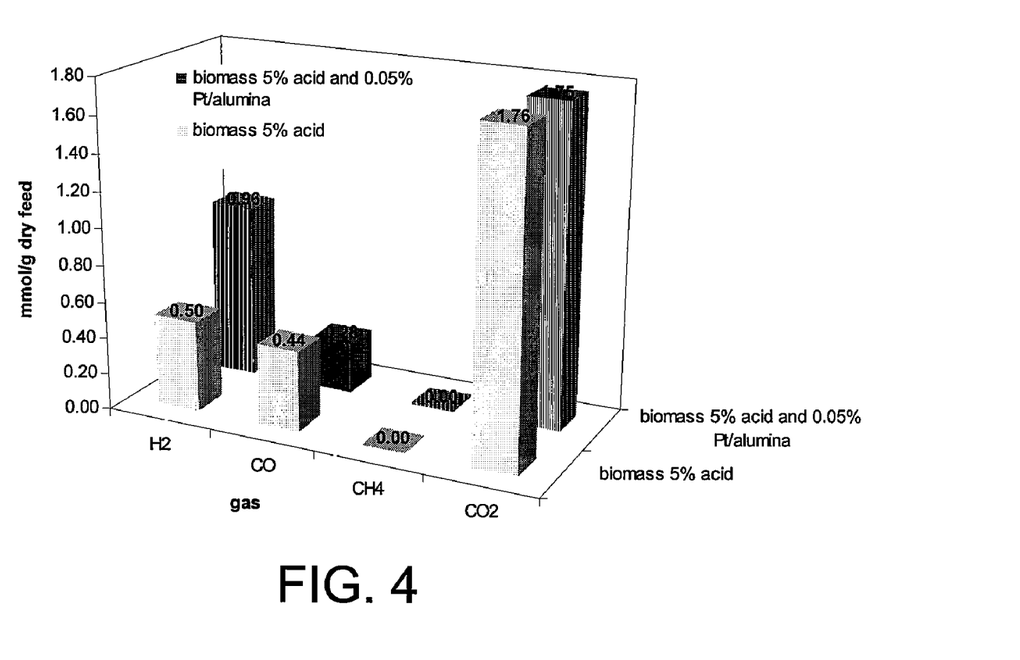
FIG. 4 illustrates a comparison of gas production in the absence and presence of platinum using woody biomass as feed.

The addition of platinum into the reaction resulted in about a two-fold increase in hydrogen production, as shown in FIG. 4. Carbon monoxide produced was lower than in the absence of platinum. Both these results might be considered indicators of the water-gas shift reaction catalyzed by platinum. Surprisingly though, the amount of carbon dioxide, which is a product of WGS, did not show any change—hinting that other reactions were also important.

Analysis of the Solid Residues Formed

The solid residue by-products of both biomass hydrolysis with 5% $H_2SO_4$ and APR with the same amount of acid and $Pt/Al_2O_3$ were analyzed. The weights of residues recovered were less than the feed dry weight, indicating degradation of the pine sawdust. The results are summarized in Table 2. Acid hydrolysis caused the complete degradation of hemicellulose as evidenced by the absence of monosaccharides other than glucose in the residue. Lignin was the main component, followed by the extractives (solvent used for extraction: dichloromethane). This result can be also used as an indicator of which wood constituent underwent chemical changes, i.e. from which the gaseous product was sourced.

Proximate analyses of the samples that were treated with (i) acid, and (ii) acid and $Pt/Al_2O_3$ catalyst, showed similar compositions of the solid residues (Table 2). Lignin was also the main component of the residue followed by the extractives component. Though there was a further decrease in the weight percent of the glucan fraction, there was not much difference in the amount of carbon in the residue. Thus, the role of APR was expected to be in the formation of gaseous products from the hydrolyzed biomass in the aqueous phase.

TABLE 2

Proximate analyses of pine saw dust solid by-products due to hydrolysis (5% $H_2SO_4$) and APR (5% $H_2SO_4$ + 10% $Pt/Al_2O_3$)

| | Hydrolysis residue[a] (wt % based on dry residual solid) | APR residue[a] (wt % based on dry residual solid) |
|---|---|---|
| Carbohydrates | | |
| Glucan | 4.30 | 1.80 |

TABLE 2-continued

Proximate analyses of pine saw dust solid by-products due to
hydrolysis (5% $H_2SO_4$) and APR (5% $H_2SO_4$ + 10% $Pt/Al_2O_3$)

| | Hydrolysis residue[a] (wt % based on dry residual solid) | APR residue[a] (wt % based on dry residual solid) |
|---|---|---|
| Xylan | -nd-[b] | -nd- |
| Galactan | -nd- | -nd- |
| Mannan | -nd- | -nd |
| Arabinan | -nd- | -nd |
| Lignin | | |
| Acid insoluble | 82.90 | 86.60 |
| Acid-soluble | 0.70 | 0.70 |
| Extractives | 6.70 | 4.40 |
| Ash | 3.90 | 4.30 |
| Total Carbon | 64.70 | 63.30 |

Figure 5:
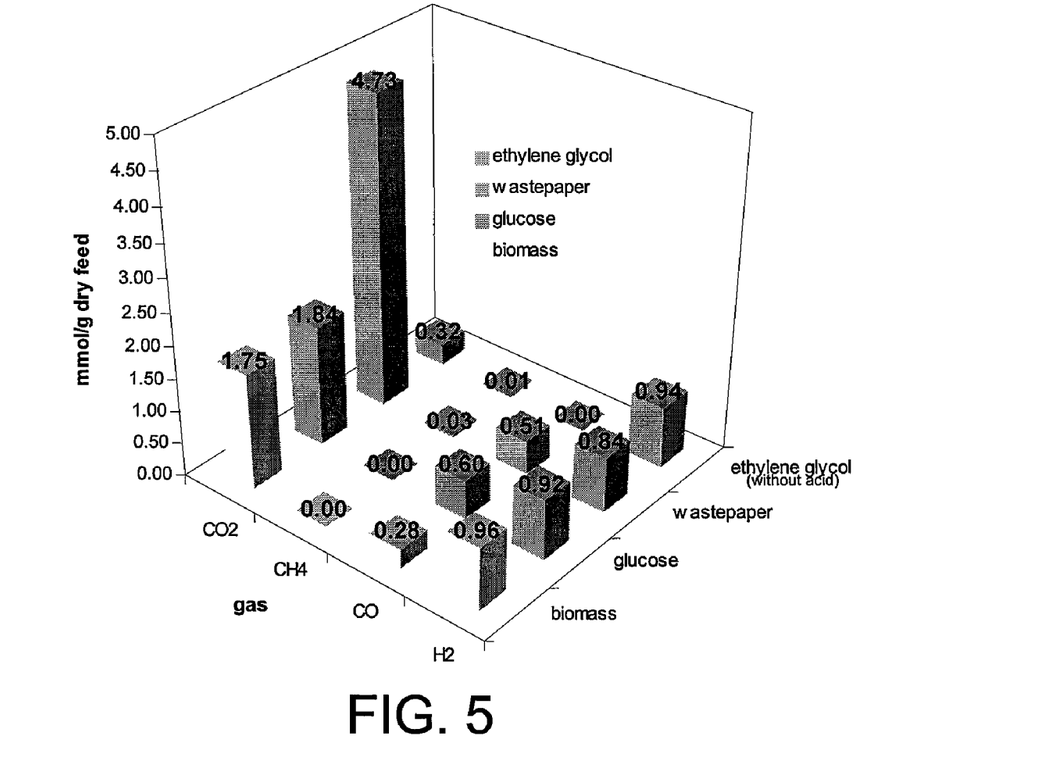
FIG. 5 illustrates a comparison of APR gas production using different feed sources in the presence of both acid and reforming catalysts (no acid for ethylene glycol).

[a]Analyses samples taken from a single representative batch treatment.
[b]nd—not detected Comparison of Biomass APR with Other Feeds FIG. 5 summarizes the gas yields of biomass, waste paper, ethylene glycol, and glucose. From the figure, it was shown that for 3-hour batch APR containing 5% $H_2SO_4$ and $Pt/Al_2O_3$, the hydrogen productions in all of the runs were about the same. Biomass surprisingly gave the highest hydrogen yield as well as percentage in the gas phase. More carbon monoxide as well as carbon dioxide was produced from feeds other than biomass. Noteworthy was the almost three fold increase in $CO_2$ production during the APR of wastepaper. This is attributed to the decomposition of calcium carbonate present in the waste paper.

Baseline Reactions

Figure 6:
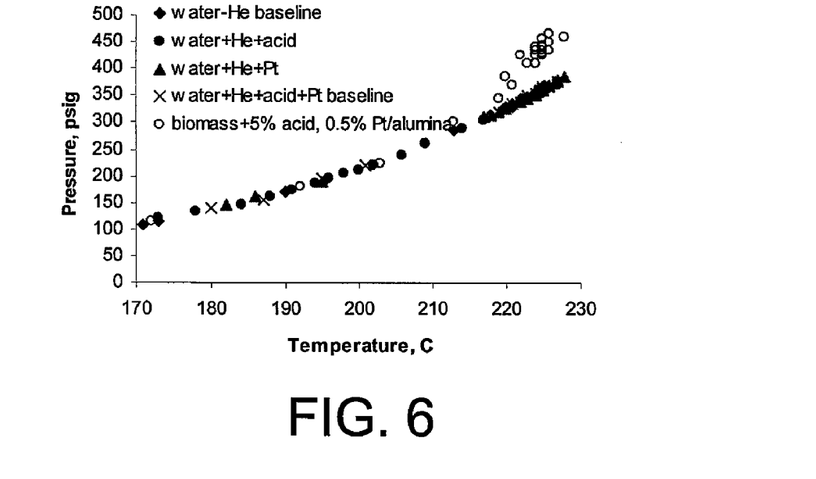
FIG. 6 illustrates an increase in system pressure due to evolution of gases. Pressure profiles: water-He baseline (♦); water-He-acid (●); water-He—Pt (▲); water-He—Pt-acid (×); biomass with both 5% acid and Pt/$Al_2O_3$ (○).

Several experiments were done to confirm that the hydrogen being produced was due to the APR of the biomass and not because of the action of either or both catalysts on water at high temperatures. As in normal APR runs, the increase in system pressure over the vapor pressure of water at a given temperature was used as an indicator for the evolution of gases. FIG. 6 summarizes the pressure profile of several runs (name indicating the components present), namely, (1) water-He baseline; (2) water-He—Pt; (3) water-He-acid; and, (4) water-He-acid-Pt. The pressure-temperature profiles for all four runs coincide on the same baseline. This establishes that any deviation (i.e., increased pressure) from this baseline in the presence of biomass can be attributed solely to the gaseous products formed during acid hydrolysis and/or APR. As seen in FIG. 6, when biomass is present together with acid and $Pt/Al_2O_3$ (open circles), a deviation from the baseline is observed.

Discussion

Acid Hydrolysis

The difference between the susceptibility of hemicelluloses and cellulose was shown in the analysis of the hydrolysis residue (Table 2). No monosaccharide other than glucose was found to be present in the residue. This glucose was expected to have come from the more recalcitrant crystalline region of cellulose. Previous studies in different operating conditions also reported the same trend.

On the other hand, lignin was not solubilized in dilute acid to any significant degree. Though some small fraction was acid-soluble, this was almost negligible compared to the acid-insoluble part (Table 1). Indeed, the weight of the lignin fraction in the solid residue increased after subjecting the pine to hydrolysis conditions in this study (operating temperature about 498K). Depolymerization of lignin occurs to a limited extent during the initial stages of hydrolysis due to the presence of some acid labile bonds that are readily hydrolyzed, especially splitting of α- and β-ether or ester linkages. However, the liberated fragments are quite reactive and tend to form insoluble condensation products of high molecular weights with longer contact with acid. For softwoods, Matsushita and Yasuda reported that the condensation of gymnosperm lignin in acidic conditions is due to the intermolecular dehydrations between benzylic carbons and the guaiacyl aromatic ring. In another study, Hasegawa et al., reported the cross-linking effect of sulfuric acid on lignin, thus producing ligneous polymeric products with higher molecular weights.

Figure 7:
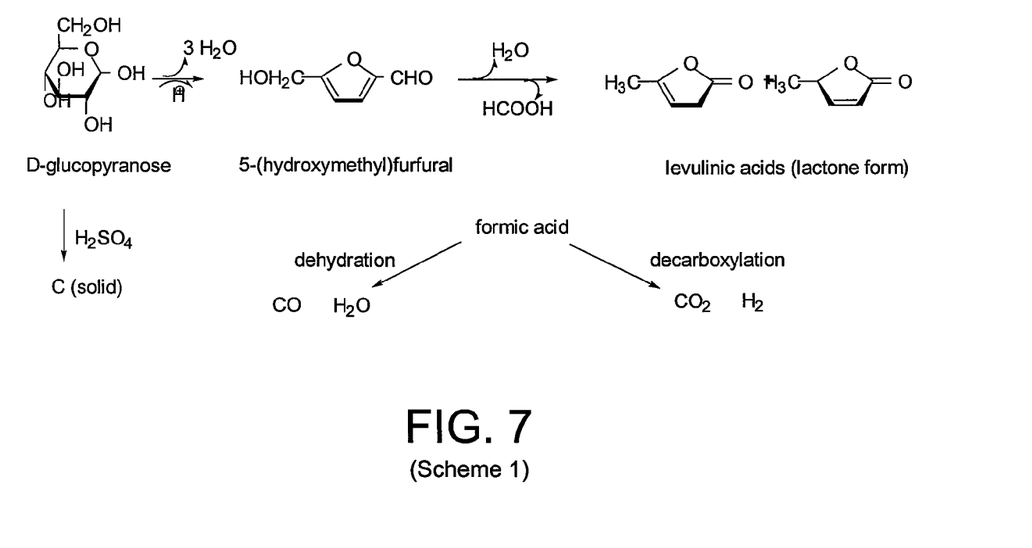
FIG. 7, Scheme 1, illustrates a proposed pathway of degradation of D-glucopyranose in the presence of acid.

Early researchers had recognized that breakdown of hemicelluloses and cellulose in the presence of acid will produce sugars that are subject to further degradation upon continued exposure to acid. Monosaccharides undergo dehydration reactions in acidic conditions giving rise to formation of what was previously referred to as "humic substances of indefinite composition", the furfurals: 5-hydroxymethyl-2-furaldehyde (HMF) (from hexoses) and 2-furaldehyde (from pentoses and hexeuronic acids) as well as some low molecular weight organic compounds. Some of the earliest studies of the mechanism for this degradation were by Feather and Harris. However, their suggested mechanism for HMF formation from fructose was later refuted by Antal et. al. Antal further reported the presence of other degradation products such as levulinic acids. A path has been established between HMF and the formation of levulinic acid, which involves formation of formic acid through decarboxylation. FIG. 7, scheme 1, summarizes a possible pathway of degradation from glucose.

It has been suggested that the decomposition of formic acid results in the formation of $H_2$ in the processing of carbohydrates. Parallel pathways for formic acid decomposition have been reported in the literature: (1) decarboxylation, to $CO_2$ and $H_2$; and, (2) dehydration, to form CO and $H_2O$, Several studies on gaseous formic acid decomposition showed that production of CO was favored over $CO_2$. On the other hand, it was noted that decarboxylation was preferred in aqueous-phase conditions. At subcritical and supercritical conditions, Yu and Savage found that formation of $CO_2$ and $H_2$ was favored over CO and $H_2O$. Corollary to these findings, computational studies showed a lower energy barrier for decarboxylation in the presence of water than for dehydration.

Considering the mechanism suggested by Sinag, et al., it could be said that the increase in acid concentration caused an increase in the degradation of the biomass, producing more degradation products (i.e., formic acid) and thus producing more hydrogen in the process. However, it must be noted that production of hydrogen through formic acid degradation is not the only possible mechanism operating in our reaction conditions. This is illustrated by the non-stoichiometric increase of $H_2$ and $CO_2$ from 1% acid to 5% acid concentration. Further study is required to elucidate the mechanism of the reactions.

The relationship between hydrogen evolution and acid concentration agree with observations from a study done by Parajo et al. In that work, they monitored the amount of xylose (derived from the hemicellulose fraction) produced in the prehydrolysis of *Eucalyptus* wood with sulfuric acid at much lower temperatures of 113° and 130° C. In their study, they found that at short times (0.25 to 1 hr), there was a significant increase in xylose concentration with increasing acid concentration from 2%-6%. Increasing the reaction temperature also improved xylose yield. However, by increasing reaction times (up to 6 hours), the amount of xylose produced decreased, starting with an acid concentration of 4% acid at 113° C. Under harsher conditions at 130° C., a decrease of xylose occurred even with just 3% of acid. They attributed these to degradation reactions that consumed the monosaccharide. These reactions, as mentioned earlier, could result in the formation of $H_2$, among other by-products.

Effect of Addition of Platinum

Platinum on alumina was identified by Dumesic et al. as a very selective catalyst for the production of hydrogen. As previously mentioned, platinum could catalyze both the C—C bond and C—O bond cleavage, generating species such as $H_2$, $CO_2$, CO, methane and other alkanes through reforming, dehydrogenation and hydrogenation reactions. Also, it could catalyze the water-gas shift reaction which produces $H_2$ and $CO_2$ from CO and $H_2O$.

In our experiments, the addition of platinum resulted in an increase in both the total amount of gaseous products formed as well as hydrogen volumetric percentage in the gas produced. In the presence of only 5% $H_2SO_4$, the gas phase products contained 18.5% $H_2$ (by volume), whereas in the presence of 5% $H_2SO_4$ and $Pt/Al_2O_3$, the gas phase contained 33.4% $H_2$. On the other hand, both $CO_2$ and CO percentages decreased—from 65% to 57% and 16.3% to 9.5%, respectively. It must be noted though that the amount of $CO_2$ produced remained almost the same while the CO yield decreased with APR—from 0.44 to 0.28 mmol/g dry feed. This might be attributed to the presence of water-gas shift reaction catalyzed by Pt. However, other liquid-phase reactions probably occurred concurrently with the reforming, water-gas shift and hydrolysis reactions. These reactions may have produced liquid-phase compounds, which cannot be quantified through gas sampling and analysis. Liquid phase analysis could give indicators of some of these reactions. However, a comprehensive survey of aqueous products is required in order to get meaningful mechanistic information, considering the chemical complexity of the feed.

Catalyst stability is an important consideration in any reaction requiring a catalyst—especially those utilizing expensive noble metals. $H_2$ chemisorption of the fresh $Pt/Al_2O_3$ catalyst showed Pt dispersion of about 26%, with a metallic surface area 0.325 $m^2$/g catalyst, and a crystallite size of about 4.4 nm. In contrast, chemisorption measurements of the spent catalysts after use in the APR reaction of biomass with exposure to sulfuric acid, water and biomass showed no measurable $H_2$ chemisorption. We initially hypothesized that this could be due to either: (i) loss of Pt from the catalyst pellets due to solubilization at reaction conditions; (ii) Pt poisoning due to interaction with sulfur species; and/or, (iii) formation of carbonaceous deposits on the catalyst that make the Pt unavailable for chemisorption.

Elemental analysis of the spent $Pt/Al_2O_3$ catalyst showed a relatively unchanged Pt/Al ratio compared to that of the fresh catalyst. We eliminate therefore the first of the probable causes given above for the absence of chemisorption capacity on the spent catalyst. This leaves us with the possibility of poisoning—either by sulfates or other sulfur species or by coke. Elemental analysis of the spent catalyst also revealed a significant sulfur content due to exposure to sulfuric acid. Indeed, the S:Pt elemental ratio was 24.3, showing that there is likely enough sulfur present to potentially allow a complete poisoning of all sulfur atoms. Though the presence of carbonaceous deposits on $Pt/Al_2O_3$ would also be expected to decrease the catalyst activity, we expect that calcination at 400° C. in air should be sufficient to burn off the carbonaceous deposits and restore some chemisorption capacity back to the catalyst. Hydrogen chemisorption after calcination of the spent catalyst also revealed little or no chemisorption capacity, indicating that sulfur poisoning is the most likely cause for the loss in capacity. Certainly, the interaction of sulfur with the platinum could contribute to the low hydrogen yields observed in this process via catalyst poisoning.

APR of Different Substrates

As mentioned earlier, previous studies on aqueous-phase reforming in the literature dealt with flow reactor studies of representative model molecules that can be derived from biomass. Ethylene glycol ($C_2H_6O_2$) was found to be a good molecule for APR with reported selectivities as high as 96% with $Pt/Al_2O_3$ and 95% with Sn-modified nickel catalyst in a continuous mode. APR of other compounds with lower H/C ratio was found to be less selective to hydrogen production. Sorbitol (H/C ratio=2.3) had a selectivity of 66% while glucose (H/C ratio=2) was reported to have about 50% selectivity.

This varied response to APR depending on the feed source became the impetus to study the use of actual biomass for hydrogen production via APR. It is important to note that a direct comparison between the current work and Dumesic's previous work with regard to hydrogen selectivity and yield is hampered by the huge influence of reactor configuration on the results (flow vs. batch, vide infra). Thus, we compared the lignocellulosic APR results with other feeds to have an idea of how this system performs compared to feeds that have already been studied. Glucose was chosen as a representative compound. Waste paper was considered as another viable, alternative source. Ethylene glycol was also used as a feed but the acid catalyst (i.e., $H_2SO_4$) was not included during its APR. This is because acid hydrolysis was deemed unnecessary since this feed has only two carbons in its backbone. The results of the study are summarized in FIG. 5.

As shown in FIG. 5, the gases produced in APR were mainly $H_2$, CO and $CO_2$. In some runs, trace peaks of $CH_4$ were detected by the GCs but the amount of methane produced was too small to be quantifiable. For ethylene glycol, $C_2H_6$ was detected but its amount was also negligible. In all the runs, the CO yield was found to be smaller as compared to the $H_2$ yield that could be attributed to the water-gas shift reaction, as mentioned before. Hydrogen production showed no dependence on the type of feed used in the system. The woody biomass produced the same amount of $H_2$ per dry gram of feed as the other compounds. It should be noted though that lignocellulosic materials contain lignin and our proximate analysis indicates for the most part, it is not degraded to produce the permanent gases under our process conditions. If we consider the yield of biomass to be based only on its carbohydrate content, there would be an increase of hydrogen yield to 1.41 mmol $H_2$ per gram of dissolved feed for pine sawdust. Similarly, waste paper gives a yield of 1.05 mmol $H_2$ per gram of carbohydrate. Thus, in this context, biomass gives a 50% higher hydrogen yield than glucose under these conditions.

It was initially expected that glucose and ethylene glycol would have produced more $H_2$ because these molecules are readily more accessible to the platinum for both the reforming and the WGS reactions to proceed. Both form a homogeneous liquid phase with water at the beginning of the reaction. However, their chemistries were quite different—as suggested by the difference in their product distribution. APR of ethylene glycol showed almost zero production of carbon monoxide. A possible reason, aside from a possibly very efficient WGS, is the presence of reactions that have gone undetected here with products that are soluble in the aqueous phase. Ethylene glycol is the only feed molecule whose product contained hydrogen as the major product rather than carbon dioxide.

Another difference between glucose and ethylene glycol APR was that the former produced a black solid residue at the end of the reaction while APR of ethylene glycol did not. The production of the black solid residue in glucose APR may be explained by the acid-catalyzed complete dehydration of sugar that leads to the production of solid carbon. This did not occur when using ethylene glycol due to the different solution chemistry of the ethylene glycol system and is not simply a consequence of the lack of sulfuric acid in these runs, as when acid was used (data not shown), all by-products remained a homogeneous liquid as well. Dumesic et al. also noted the difference between APR behavior of ethylene glycol and glucose. They attributed this to further degradation reactions of glucose in the liquid phase which ethylene glycol did not undergo. By virtue of its smaller size and perhaps the absence of the carbonyl functionality, ethylene glycol may undergo fewer reactions than glucose.

The APR of wastepaper showed a very high amount of $CO_2$ produced. This can be attributed to the presence of fillers and additives that go into the production of paper. $CaCO_3$ based fillers eventually produce $CO_2$ upon decomposition. However, it must be noted that $CaCO_3$ decomposition itself occurs at very high temperatures. For ground calcium carbonate (GCC) and precipitated calcium carbonate (PCC) (two forms that are usually used as fillers in the paper manufacturing industry) thermal decomposition occurs from 1150K. It is then proposed that formation of $CO_2$ in the process could have been brought about by two pathways: (a) the reaction of the acid and $CaCO_3$ which directly liberates $CO_2$; and, (b) formation of carbonic acid from the dissociation of calcium carbonate to $Ca^{2+}$ and $CO_3^{2-}$, which then undergoes water-catalyzed decomposition to produce $CO_2$. Baseline reactions.

Experiments showed that baseline reactions (water-He and acid, water-He and $Pt/Al_2O_3$, and water-He, acid and $Pt/Al_2O_3$) did not register any increase in the total system pressure of runs with only water and pressurized with He. As such, evolution of gases other than steam was considered absent, even in the presence of platinum.

Mechanisms leading to hydrogen evolution from water on the surface of platinum have been suggested in the literature. However, while these published papers also indicate that although the release of two hydride species from the platinum site to form $H_2$ is favorable (k is in the order of $\sim 10^{13}$), the initial reaction where water binds to an available platinum site ($k=\sim 10^{-1}$) is much slower compared to the reverse reaction ($k=\sim 10^{13}$). Indeed, a literature search shows platinum-catalyzed production of hydrogen from water occurs only in photocatalytic reactions.

An experiment with biomass with no catalysts was also performed. Even in the absence of acid, traces of hydrogen were generated. This minimal hydrogen production may be attributed to the hydrolysis due to the auto-ionization of water at elevated temperatures. Hydrolysis due to the release of acetic acid from acetylated hemicellulose groups was considered to be of a lower extent compared to the water autoionization effect.

FIG. 6 shows that the total system pressure of biomass APR became higher than the saturated vapor pressure of water at temperatures higher than about 210° C. We attribute this to the onset of the reforming and/or WGS reactions that are favorable at these temperatures. In our system, the operating temperature of about 225° C. was usually attained at around 45 minutes. A noticeable steady increase in system pressure was noted up to about 1.5 to 2 hours, after which, pressure was more stable (i.e. rate of pressure increase was usually much slower).

Lastly, the importance of the platinum in the production of hydrogen in the gas phase was probed with runs having γ-alumina and sulfuric acid acting as catalysts in the reaction. Results of these tests showed that hydrogen production was only about 5% of the total amount of hydrogen produced in the presence of $Pt/Al_2O_3$ and sulfuric acid. This clearly points to the role of platinum in hydrogen production.

On Comparison Between Batch and Continuous Mode

In this example, we have applied modified APR to actual biomass using a batch reactor. As a proof of concept, we have shown that hydrogen can be produced from pine saw dust at a much lower temperature than traditional gasification or pyrolysis processes by using a combination of two processes: acid hydrolysis and platinum-catalyzed reforming. APR of other substrates such as glucose and ethylene glycol, using the same batch Parr reactor, showed comparable hydrogen yields. This creates the hypothesis that biomass could perform as well as ethylene glycol in a continuous reactor—if acid hydrolysis for biomass is integrated into the process.

Two parameters may be considered important in evaluating APR: turnover frequency (TOF) and selectivity. We compute TOF by considering only the $H_2$ production attributed to platinum reforming by subtracting the amount of hydrogen produced when only 5% acid is reacted with the feed. Table 3 presents the summary of these values. It also shows a comparison of our data from the batch reactor with the TOF values of previous studies with platinum as catalyst in a flow system. Interestingly, the TOFs observed in our batch system are quite similar to those observed in the previous studies of Dumesic. The values given are calculated considering the whole 3-hour batch run. On the other hand, if the heating time to 498K is discounted (the first 45 minutes where no increase in system pressure is observed over the vapor pressure of water), TOFs for pine sawdust, glucose, and ethylene glycol (without acid) are 2.6, 1.7, and 11 $min^{-1}$, respectively—showing higher $H_2$ production per surface Pt atom per minute. With respect to $H_2$ selectivity, use of ethylene glycol in our system gave a value of 110%. This is higher compared to the previously reported ethylene glycol selectivity when $Pt/Al_2O_3$ was used as the catalyst. In another study using Co as catalyst, Huber, et al reported a selectivity 128.9% for ethylene glycol at a conversion of 1%. A possible reason for this is the conversion of ethylene glycol into dehydrated species that are in the liquid phase and are thus not accounted for in the total C atoms in the gas phase. However, our system suffers from a lower selectivity for glucose APR—20% as opposed to a reported 50% by Cortright et al. This might be due to large void spaces that are unavoidable in a batch system (vide infra).

TABLE 3

$H_2$ turnover frequency (TOF) of APR of different substrates

| | TOF, $min^{-1}$ | |
| --- | --- | --- |
| Feed | | (Dumesic, et al.) |
| Pine saw dust | 2.0 | — |
| Glucose | 1.3 | $0.5^a$ |
| Ethylene glycol | 8.0 | $7^a$ $6.72^b$ |

Previous studies done by Dumesic, et al. used continuous reactors for APR studies of ethylene glycol as well as other model compounds. They have noted the adverse effect of void space on hydrogen production, especially for feeds such as glucose and sorbitol. Void space here was defined as portions of the reactor that do not contain solid catalyst. According to their reports, void spaces caused homogeneous liquid reactions that culminate in the production of acids, aldehydes and other liquid products. These reactions compete with APR— thus, hydrogen selectivity as well as hydrogen yield were reduced. The presence of void space is essentially unavoidable in our batch system. Thus, lower hydrogen yields are to be expected. Considering this, a continuous system would be an improvement in the reported batch process. However, due to a solid feed as well as production of a solid residue in biomass APR, design of a continuous process is expected to be more challenging than for the APR of model compounds.

SUMMARY AND CONCLUSIONS

The aqueous-phase reforming (APR) of real biomass is first reported in this contribution. Studies indicate that breakdown of the polymeric lignocellulosic components allows for the formation of hydrogen at temperatures much lower than those currently used in gasification and pyrolysis processes. Increasing acid concentration hastens the breakdown of these components. Addition of a reforming catalyst such as $Pt/Al_2O_3$ facilitates the formation of more hydrogen in the reaction product gas. Comparisons between APR of different feeds (biomass, glucose, ethylene glycol and wastepaper) showed effectively no difference in the amount of hydrogen produced per gram of feed. However, the hydrogen yields per gram of carbohydrate were different, with biomass giving the highest yield.

We claim:

1. A method of generating hydrogen ($H_2$) from a biomass, comprising:
    providing a biomass, an acid, a catalyst, and water;
    mixing the biomass, the acid, the catalyst, and the water in a reaction chamber to form a mixture, wherein the reaction chamber is configured to form a gas tight seal;
    replacing a headspace gas in the reaction chamber with an inert gas;
    forming a gas tight seal in the reaction chamber;
    heating the mixture to at least about 200° C., wherein the pressure in the reaction chamber increases to at least about 200 pounds per square inch (psi), wherein acid hydrolysis breaks down the biomass into components; and
    generating $H_2$ from the biomass, wherein a catalytic reaction between the components of the biomass and the catalyst produce $H_2$.

2. The method of claim 1, wherein the biomass is chosen from: a plant, a tree, a crop, a crop residue, a grass, a forest and mill residue, a wood and wood waste, waste paper, and a combination thereof.

3. The method of claim 1, wherein the biomass is saw dust.

4. The method of claim 1, wherein the acid is chosen from: sulfuric acid, nitric acid, hydrochloric acid, phosphoric acid, trifluoroacetic acid, and a combination thereof.

5. The method of claim 1, wherein the acid is sulfuric acid.

6. The method of claim 1, wherein the catalyst is chosen from: platinum, a platinum compound, nickel, a nickel compound, palladium, a palladium compound, ruthenium, a ruthenium compound, rhodium, a rhodium compound, iridium, an iridium compound, cobalt, a cobalt compound, a mixture, mixtures and alloy of each, and a combination thereof.

7. The method of claim 1, wherein the catalyst is $Pt/Al_2O_3$.

8. The method of claim 1, wherein heating includes:
    heating the mixture to at least about 225° C., the pressure in the reaction chamber increases to at least 300 pounds per square inch (psi), wherein the increase in pressure is the result of converting the biomass to gaseous products, wherein at least one gaseous component is $H_2$.

9. The method of claim 1, further comprising:
    holding the mixture at a temperature of at least about 225° C. for at least 1 hour.

10. The method of claim 1, wherein the ratio of dry biomass to water is about 1:9.

11. The method of claim 1, wherein the concentration of the acid is about 3 to 8 wt % based on dry biomass.

12. The method of claim 1, wherein the ratio of dry biomass to catalyst is about 10:1.

13. The method of claim 1, wherein the biomass is saw dust, wherein the acid is sulfuric acid, and wherein the catalyst is $Pt/Al_2O_3$.

14. A method of generating hydrogen ($H_2$) from a biomass, comprising:
    heating a biomass, an acid, a catalyst, and water in a reaction chamber to at least 200° C.;
    breaking down the biomass into one or more components using acid hydrolysis; and
    reacting the catalyst with the hydrolyzed components of the biomass to generate $H_2$.

15. The method of claim 14, wherein the biomass is chosen from: a plant, a tree, a crop, a crop residue, a grass, a forest and mill residue, a wood and wood waste, waste paper, and a combination thereof.

16. The method of claim 14, wherein the biomass is saw dust.

17. The method of claim 14, wherein the acid is chosen from: sulfuric acid, nitric acid, hydrochloric acid, phosphoric acid, trifluoroacetic acid, and a combination thereof.

18. The method of claim 14, wherein the acid is sulfuric acid.

19. The method of claim 14, wherein the catalyst is chosen from: platinum, a platinum compound, nickel, a nickel compound, palladium, a palladium compound, ruthenium, a ruthenium compound, rhodium, a rhodium compound, iridium, an iridium compound, cobalt, a cobalt compound, a mixture, mixtures and alloy of each, and a combination thereof.

20. The method of claim 14, wherein the catalyst is $Pt/Al_2O_3$.

21. The method of claim 14, wherein the components are chosen from: cellulose, hemicellulose, and a combination thereof.

22. The method of claim 14, wherein heating includes:
    heating the mixture to at least about 225° C., the pressure in the reaction chamber increases to at least 300 pounds per square inch (psi), wherein the increase in pressure is the result of converting the biomass to gaseous products, wherein at least one gaseous component is $H_2$.

23. The method of claim 22, further comprising:
    holding the mixture at a temperature of at least about 225° C. for at least 1 hour.

24. The method of claim 23, wherein the concentration of the acid is about 3 to 8 wt % based on dry biomass.

25. The method of claim 24, wherein the biomass is saw dust, wherein the acid is sulfuric acid, and wherein the catalyst is $Pt/Al_2O_3$.

* * * * *